US011970882B2

(12) United States Patent
Manser et al.

(10) Patent No.: US 11,970,882 B2
(45) Date of Patent: Apr. 30, 2024

(54) SECURITY SYSTEM FOR PORTABLE CONSUMER ARTICLE

(71) Applicant: SE-KURE CONTROLS, INC., Franklin Park, IL (US)

(72) Inventors: John W. Manser, Elgin, IL (US); Lazaro Fraiman, Skokie, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 767 days.

(21) Appl. No.: 16/950,358

(22) Filed: Nov. 17, 2020

(65) Prior Publication Data

US 2022/0154495 A1 May 19, 2022

(51) Int. Cl.
*E05B 69/00* (2006.01)
*A47F 5/00* (2006.01)
*A47F 5/08* (2006.01)

(52) U.S. Cl.
CPC .......... *E05B 69/006* (2013.01); *A47F 5/0006* (2013.01); *A47F 5/0861* (2013.01)

(58) Field of Classification Search
CPC ........ E05B 69/006; E05B 69/00; E05B 69/02; E05B 73/00; A47F 5/0861
See application file for complete search history.

(56) References Cited

U.S. PATENT DOCUMENTS

| | | | | |
|---|---|---|---|---|
| 862,505 | A | 8/1907 | Perrin | |
| 1,233,576 | A | 7/1917 | Higgins | |
| 2,879,896 | A * | 3/1959 | Green | B25H 3/04 211/4 |
| 3,242,704 | A | 3/1966 | Barreca | |
| 4,511,041 | A * | 4/1985 | Waitzman | E05B 73/00 312/219 |
| 9,404,290 | B2 | 8/2016 | Leyden | |
| 9,622,596 | B2 * | 4/2017 | Trainor-Smith | A47F 7/022 |
| 10,694,871 | B1 * | 6/2020 | Vogler | A47F 5/0861 |
| 2009/0095695 | A1 * | 4/2009 | Moock | A47F 5/0861 211/57.1 |
| 2015/0167356 | A1 * | 6/2015 | Leyden | E05B 73/0017 223/85 |
| 2017/0127827 | A1 | 5/2017 | Leyman | |
| 2018/0051491 | A1 | 2/2018 | Chesterton | |
| 2020/0205586 | A1 * | 7/2020 | Arradondo | A47F 5/0006 |
| 2020/0370344 | A1 | 11/2020 | Manser | |

* cited by examiner

*Primary Examiner* — Christine M Mills
*Assistant Examiner* — Yahya Sidky
(74) *Attorney, Agent, or Firm* — Wood, Phillips, Katz, Clark & Mortimer

(57) ABSTRACT

A security system having: a frame with first and second support assemblies respectively having first and second cantilevered arms, each with a free end; and a blocking assembly. The first free end can be directed into a U-shaped portion on a first portable consumer article to allow the U-shaped portion to straddle the first cantilevered arm. The second free end can be directed into a U-shaped portion on a second portable consumer article to allow the U-shaped portion on the second article to straddle the second cantilevered arm. Changing the blocking assembly from the loading state into the securing state prevents the first and second articles, straddling respective arms, from being separated from the security system. Changing the blocking assembly from the securing state into the loading state allows either of the first and second displayed articles to be separated from the security system without separating the other.

20 Claims, 8 Drawing Sheets

SECURITY SYSTEM FOR PORTABLE CONSUMER ARTICLE

BACKGROUND OF THE INVENTION

Field of the Invention

This invention relates to point-of-purchase displays for portable consumer articles and, more particularly, to a security system configured to support a plurality of the portable consumer articles in a hanging, display position.

Background Art

A multitude of consumer articles is displayed in different businesses for inspection and handling by prospective purchasers. Point-of-purchase displays are commonly designed and placed to allow displayed products to be highly visible and accessible as to be handled and compared, one to the next. While this display model is highly effective in terms of generating consumer interest, it also tempts persons to engage in theft.

As an example, purses are often displayed in dedicated departments in relatively large numbers, differing by style, manufacturer, color, etc. An effective display allows the potential consumer to handle and inspect individual purses adequately to make a purchasing decision.

One common display utilizes a plurality of projecting posts or hooks over which an inverted U-shaped portion of a strap on each purse can be straddled to support the purse at a level convenient for viewing or access. Potential purchasers are allowed to remove the purses individually and handle them in an unobstructed, normal manner. While this type of display is highly effective in terms of motivating consumer purchases, it also gives potential thieves a relatively easy target. An unrestrained purse can be withdrawn and blended into a person's garb so as to potentially go unnoticed as he/she leaves the premises.

Even if an EAS tag is utilized that may be detected at an exit location, a clever thief may quickly leave the premises with one or more stolen purses before security personnel can react timely to a breach signal.

Given the increasing cost of designer apparel, and other types of portable consumer articles that can be hung in display positions, security systems have become more critical in any establishment where such products are displayed. Purses and other like, small articles, may sell for thousands of dollars which warrants a significant investment in security.

One exemplary security system is sold by the assignee herein and is the subject of U.S. patent application Ser. No. 16/877,700. In this system, a cantilevered bar can be projected through a U-shaped portion of a closed loop, as defined by a purse strap, to allow a plurality of the purses to be serially placed in display positions along the length of the bar.

A component is movable between loading and secured positions and, in the loading position, allows the articles/purses to be selectively placed in display positions and moved out of the display positions and separated from the security system. In the secured position for the component, movement of the purses, with the straps straddling the bar, is confined so that the displayed purses cannot be separated from the security system. A locking structure maintains this secured position for the component, which can be changed back into the loading position only by a person with a key, authorized code, etc.

The above system has been commercially successful in that it has been effective in terms of performing its security function while at the same time allowing the exemplary purses to be slid back and forth on the elongate bar to allow adequate inspection of each of the displayed purses.

One limitation of this system has been that once the purses are displayed and the component is moved from the secured position into the loading position, the exemplary purses must be removed by reversing the placement order last in, first out. Thus, if the first placed purse is of primary interest to a consumer, the remaining purses must be removed to allow the purse of interest to be separated from the security system. This creates some inconvenience to the consumer and the personnel responsible for monitoring the display.

At the same time, if a large number of purses are displayed, while the purse of interest is being accessed, the removed purses remain in an unprotected state until they are placed back into their display positions and the component placed in the secured position and locked.

The industry continues to seek alternative designs for security systems that are affordable, highly reliable, and offer convenience, both to the customer in terms of allowing adequate product inspection, and to the business owner in terms of facilitating system setup and operation while allowing efficient separation of any of multiple products displayed on the security system.

SUMMARY OF THE INVENTION

In one form, the invention is directed to the combination of first and second portable consumer articles, each having a U-shaped portion, and a security system. The security system includes: a frame having first and second support assemblies respectively having first and second cantilevered arms respectively with first and second free ends; and a blocking assembly changeable selectively between a securing state and a loading state. The security system is configured so that by relatively moving the first cantilevered arm and the first portable consumer article with the blocking assembly in the loading state, the first free end can be directed into and through the U-shaped portion on the first portable consumer article to allow the U-shaped portion on the first portable consumer article to straddle and bear downwardly against the first cantilevered arm whereby the first portable consumer article is in a display position. The security system is further configured so that by relatively moving the second cantilevered arm and the second portable consumer article with the blocking assembly in the loading state, the second free end can be directed into and through the U-shaped portion on the second portable consumer article to allow the U-shaped portion on the second portable consumer article to straddle and bear downwardly against the second cantilevered arm whereby the second portable consumer article is in a display position. The security system is still further configured so that: a) with the first and second portable consumer articles in respective display positions, by changing the blocking assembly from the loading state into the securing state the first and second portable consumer articles are prevented from being separated from the security system; and b) with the first and second portable consumer articles in respective display positions, by changing the blocking assembly from the securing state into the loading state either of the first and second portable consumer articles can be separated from the security system while maintaining the other of the first and second portable consumer articles in its display position.

In one form, the frame has an elongate base member with a length between a mounting end and an opposite end. The mounting end is connected to a primary support so that the length of the elongate base member projects away from the primary support.

In one form, the elongate base member is cantilever mounted with respect to the primary support.

In one form, the first and second cantilevered arms reside below the elongate base member.

In one form, the first and second cantilevered arms each is elongate with a length aligned generally with the length of the elongate base member.

In one form, the frame has first and second supports connecting respectively between the elongate base member and the first and second cantilevered arms.

In one form, the first and second supports are each substantially elongate with a length. The lengths of the first support and first cantilevered arm align to produce an “L” shape. The lengths of the second support and second cantilevered arm align to produce an “L” shape.

In one form, the free ends of the first and second cantilevered arms respectively have first and second offsets. The lengths of the first support and first cantilevered arm together with the first offset align to produce a “J” shape. The lengths of the second support and second cantilevered arm together with the second offset align to produce a “J” shape.

In one form, the blocking assembly has an elongate component that moves relative to the frame between first and second positions. The blocking assembly is in the loading state with the elongate component in the first position. The blocking assembly is in the securing state with the elongate component in the second position.

In one form, the elongate component pivots relative to the frame in moving between the first and second positions.

In one form, with the elongate component in the second position, the U-shaped portion of the first portable consumer article in its display position resides between one part of the elongate component and the first cantilevered arm. The U-shaped portion of the second portable consumer article in its display position resides between another part of the elongate component and the second cantilevered arm.

In one form, with the elongate component in the second position, the elongate component and first cantilevered arm cooperatively extend fully around a part of the U-shaped portion of the first portable consumer article in its display position.

In one form, the elongate component has a discrete void into which the part of the U-shaped portion of the first portable consumer article can extend with the first portable consumer article in its display position and the elongate component in the second position.

In one form, the elongate component is connected to the frame through a first link member with spaced ends. One of the spaced ends is connected to the frame for pivoting movement relative to the frame around a first axis. The other of the spaced ends is connected to the elongate component for pivoting movement relative to the elongate component around a second axis.

In one form, the elongate component is connected to the frame through a second link member with spaced ends. One of the spaced ends of the second link member is connected to the frame for pivoting movement relative to the frame around a third axis. The other of the spaced ends of the second link member is connected to the elongate component for pivoting movement relative to the elongate component around a fourth axis.

In one form, the length of the elongate component maintains a substantially constant horizontal orientation as the elongate member is changed between the first and second positions.

In one form, the frame has a portion that is configured to cooperate with a portion of the elongate component so that the portions of the frame and elongate member move from a separated relationship to a nested relationship wherein one of the portions of the frame and elongate member seats in the other of the portions of the frame and elongate member as an incident of the elongate component moving from the first position into the second position.

In one form, the security system further includes a locking assembly that is changeable between locked and unlocked states. The locking assembly is configured so that in the locked state the locking assembly blocks pivoting of the first link relative to the frame.

In one form, the invention is provided in further combination with the primary support that has a vertically extending component.

In one form, each of the first and second portable consumer articles is a purse with a body and a strap. The strap defines the U-shaped portion and in conjunction with the body defines a closed loop shape.

In one form, the invention is directed to a security system as described above.

DETAILED DESCRIPTION OF THE PREFERRED EMBODIMENT

Figure 1:
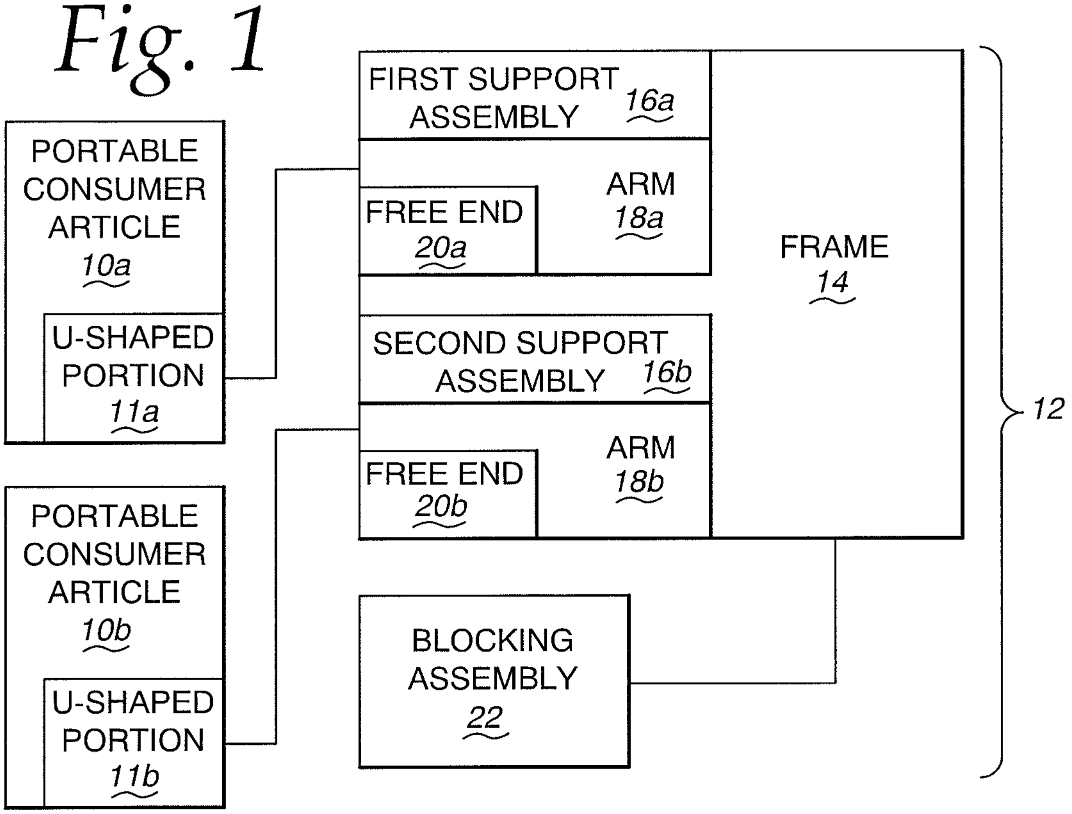
FIG. 1 is a schematic representation of one combination of portable consumer articles and a security system therefor, according to the invention, for maintaining the portable consumer articles in display positions thereon.

As depicted in schematic form in FIG. 1, the invention is directed to an exemplary combination of first and second portable consumer articles 10*a*, 10*b* with U-shaped portions 11*a*, 11*b*, respectively, and a security system at 12, on which the portable consumer articles 10*a*, 10*b* are securely displayed. The security system 12 has a frame 14 having first and second support assemblies 16*a*, 16*b* respectively having first and second cantilevered arms 18*a*, 18*b*, in turn respectively with first and second free ends 20*a*, 20*b*.

The security system 12 further includes a blocking assembly 22 changeable selectively between a securing state and a loading state. While the security system 12 is described as it cooperates with exemplary portable consumer articles hereinbelow, it should be understood that the invention is also directed to the security system 12 itself.

Further, it should be understood that while FIG. 1 depicts two exemplary portable consumer articles 10*a*, 10*b*, and a security system 12 to accommodate those two articles, it is contemplated that the security system 12 may accommodate any number of portable consumer articles in excess of two. Further, while the combination is characterized as including two displayed portable consumer articles 10*a*, 10*b*, only one such portable consumer article 10*a*, 10*b* may actually be displayed on the security system 12.

The security system 12 is configured so that by relatively moving the first cantilevered arm 18*a* and the first portable consumer article 10*a* with the blocking assembly 22 in the loading state, the first free end 20*a* can be directed into and through the U-shaped portion 11*a* on the first portable consumer article 10*a* to allow the U-shaped portion 11*a* to straddle and bear downwardly against the first cantilevered arm 18*a*, whereby the first portable consumer article 10*a* is in a display position.

The security system 12 is further configured so that by relatively moving the second cantilevered arm 18*b* and the second portable consumer article 10*b* with the blocking assembly in the loading state, the second free end 20*b* can be directed into and through the U-shaped portion 11*b* on the second portable consumer article 10*b* to allow the U-shaped portion 11*b* on the second portable consumer article 10*b* to straddle and bear downwardly against the second cantilevered arm 18*b*, whereby the second portable consumer article 10*b* is in a display position.

The security system 12 is configured so that: a) with the first and second portable consumer articles 10*a*, 10*b* in respective display positions, by changing the blocking assembly 22 from the loading state into the securing state, the first and second portable consumer articles 10*a*, 10*b* are prevented from being separated from the security system 12; and b) with the first and second portable consumer articles 10*a*, 10*b* in respective display positions, by changing the blocking assembly 22 from the securing state into the loading state, either of the first and second portable consumer articles 10*a*, 10*b* can be separated from the security system 12 while maintaining the other of the first and second portable consumer articles 10*a*, 10*b* in its display position.

The schematic depiction of the security system 12 and portable consumer articles 10*a*, 10*b* in FIG. 1 is intended to encompass specific forms thereof, as described below, as well as virtually an unlimited number of modifications of the system components and their interaction. Such modifications would be obvious to one skilled in the art based upon the disclosure and teachings herein.

For example, the portable consumer articles 10*a*, 10*b* may be any article with a U-shaped portion, such as a purse or the like, which as described below is representative in nature only. A purse strap and body collectively define a closed opening with the strap defining the U-shaped portion that is used to straddle one of the arms 18*a*, 18*b* and bear downwardly thereagainst to maintain the display position for the purse.

The invention contemplates any portable consumer article having at least the U-shaped portion capable of straddling a support arm and bearing thereagainst in a display position.

Specific forms of the security system 12 and portable consumer articles 10 will be described with respect to FIGS. 2-22, below.

In the specific embodiment disclosed, the frame 14 consists of an elongate base member 24 with a length L between a mounting end 26 and an opposite end 27.

The mounting end 26 is connected through one form of connector 28, as shown in FIGS. 2-16, to a primary support, shown schematically at 30 in FIG. 2, and described in alternative forms below, so that the length thereof projects away from the primary support 30. The opposite end 27 may be unsupported or may be connected to an optional additional primary support, as shown schematically at 31 in FIG. 2.

For purposes of simplicity, the elongate base member 24 will be described hereinbelow as being cantilever mounted only to the primary support 30 through the end 26.

In this embodiment, the base member 24 has an optional hollow, rectangular cross-sectional configuration with a height H and a width W less than the height H.

As depicted, there are five cantilevered arms 18*a*, 18*b*, 18*c*, 18*d*, 18*e* fixedly mounted to the elongate base member 24 so as to reside therebelow. The arms 18*a*-18*e* are each part of a corresponding number of support assemblies 16*a*, 16*b*, 16*c*, 16*d*, 16*e* and are spaced equidistantly from each other along the length of the base member 24 so that there are equal gaps at 32 therebetween.

While not required, each of the cantilevered arms 18*a*-18*e* is elongate with a length aligned generally with the length of the elongate base member 24. The arms 18*a*-18*e* may have other than the straight shape depicted.

Each of the arms 18*a*-18*e* is mounted in similar fashion to the elongate base member 24. Exemplary arms 18*a*, 18*b* are connected to the elongate base member 24 through first and second supports 34*a*, 34*b*.

The supports 34*a*, 34*b* are each substantially elongate with a length, with the lengths of the supports 34*a*, 34*b* and arms 18*a*, 18*b* aligned to produce an "L" shape at each support assembly 16*a*, 16*b*.

The free ends 20*a*, 26*b* of the arms 18*a*, 18*b* respectively have first and second offsets 38*a*, 38*b*. The lengths of the support 34*a* and first arm 18*a*, together with the first offset 38*a*, align to produce an overall "J" shape on the exemplary support assembly 16*a*.

While not required, the same configuration is provided in conjunction with the arm 18*b*, as well as the other arms 18*c* through 18*e*.

Figure 3:
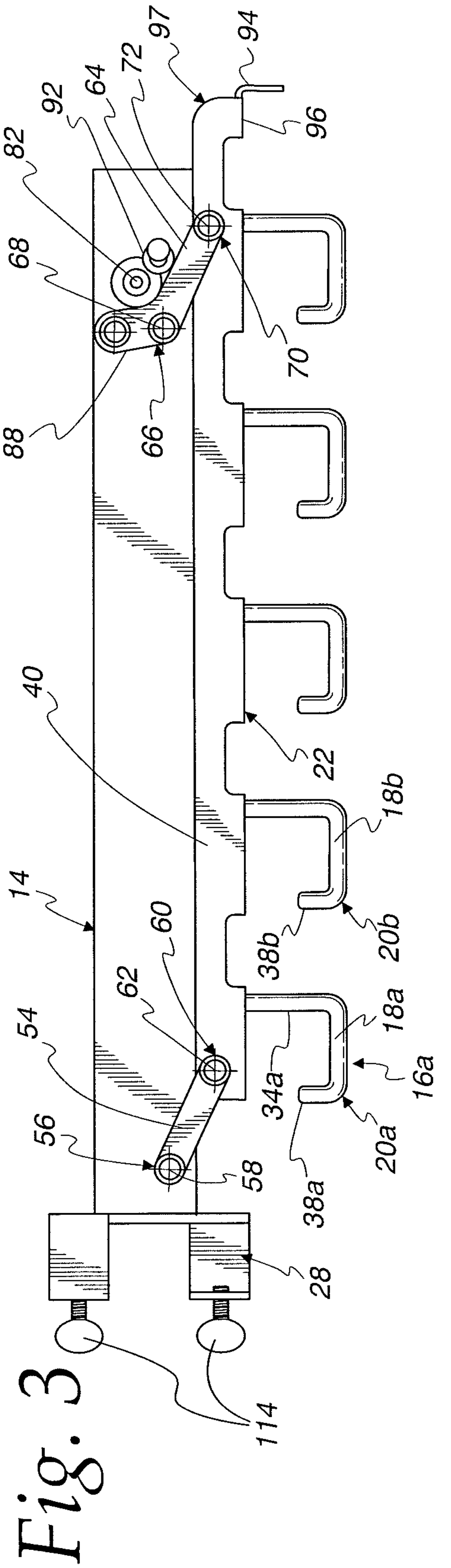
FIG. 3 is a side elevation view of the security system in FIG. 2 in an assembled state and with a blocking assembly thereon in a loading state.
Figure 9:
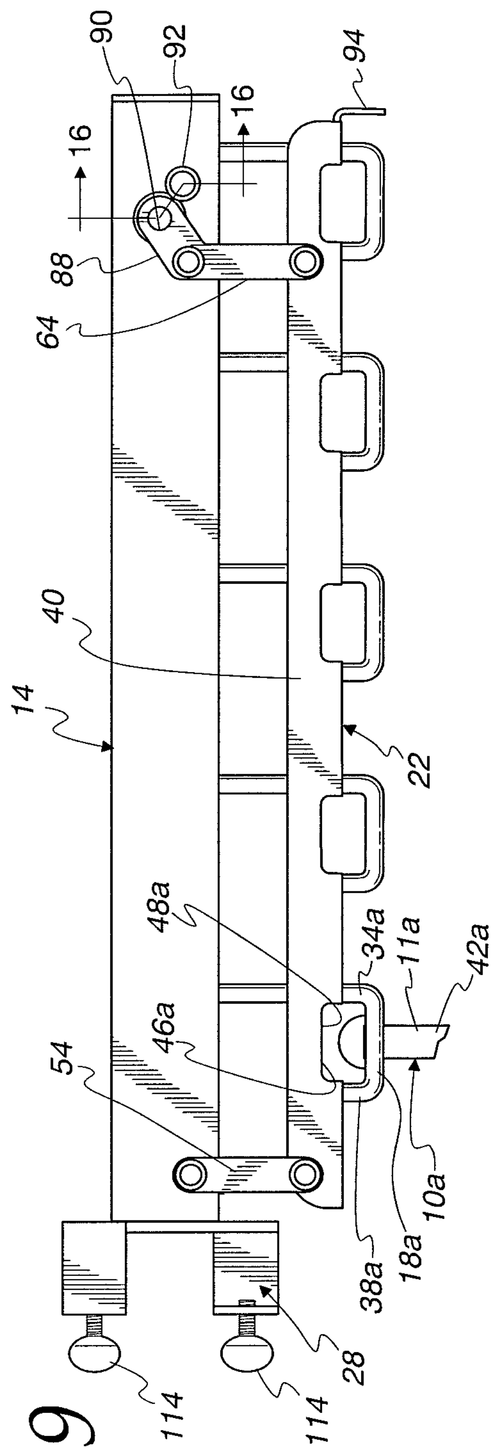
FIG. 9 is a view as in FIG. 3 with the blocking assembly changed into a securing state.
Figure 10:
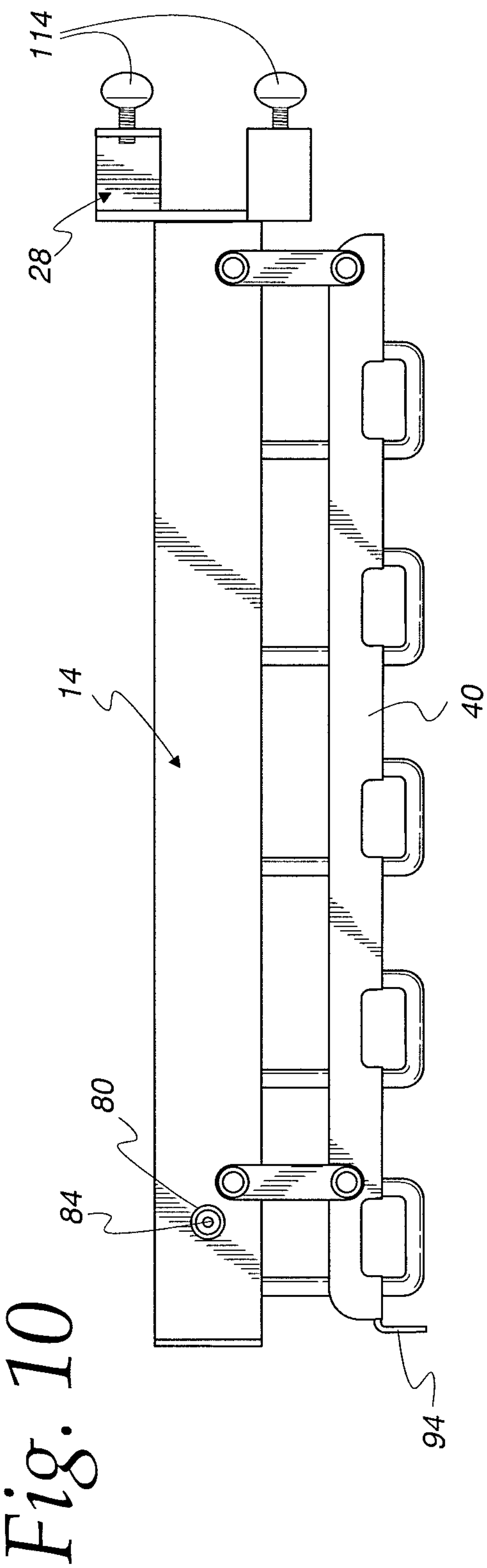
FIG. 10 is an elevation view of the security system in the FIG. 9 state and from the side opposite that in FIG. 9.

The blocking assembly 22 has an elongate component 40 that moves relative to the frame 14 between a first position, as shown clearly in FIG. 3, and a second position, as shown clearly in FIG. 9. The elongate component 40 has openings 41*a*, 41*b*, 41*c*, 41*d*, 41*e* to accommodate and potentially guide the "J" shapes on the blocking assemblies 22*a*, 22*b*, 22*c*, 22*d*, 22*e* throughout the range of movement of the elongate component 40.

The blocking assembly 22 is in the loading state with the elongate component 40 in the first position. The blocking assembly 22 is in the securing state with the elongate component 40 in the second position.

In this embodiment, the elongate component 40 pivots relative to the frame 14 in moving between its first and second positions.

Figure 4:
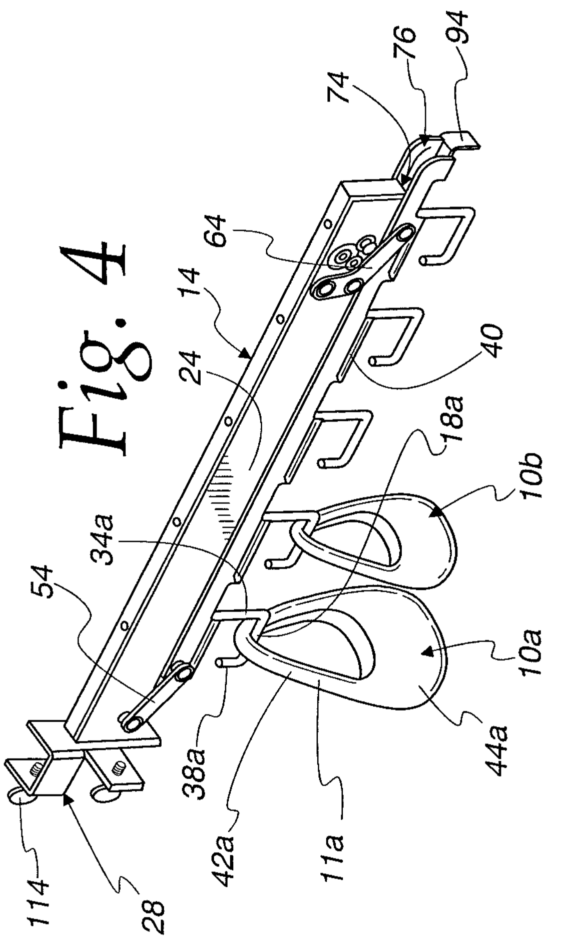
FIG. 4 is a perspective view of the security system in the FIG. 3 state and with two exemplary portable consumer articles each placed in a display position thereon.
Figure 5:
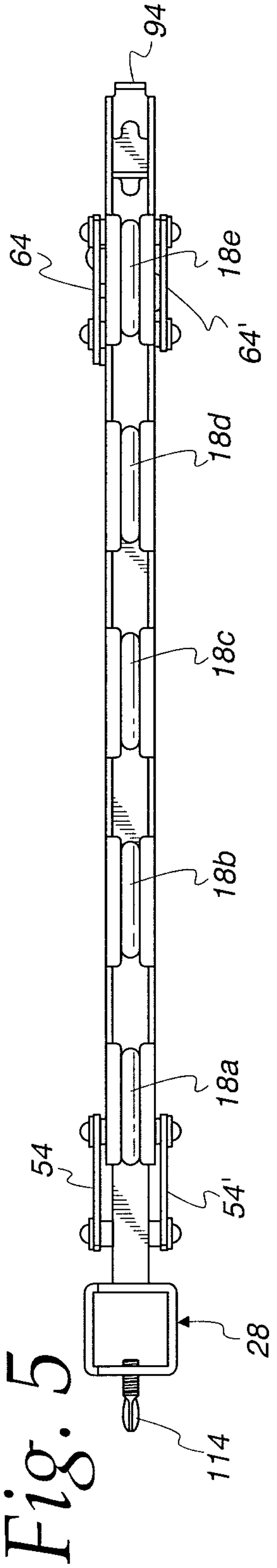
FIG. 5 is a bottom view of the security system in the FIG. 3 state.
Figure 6:
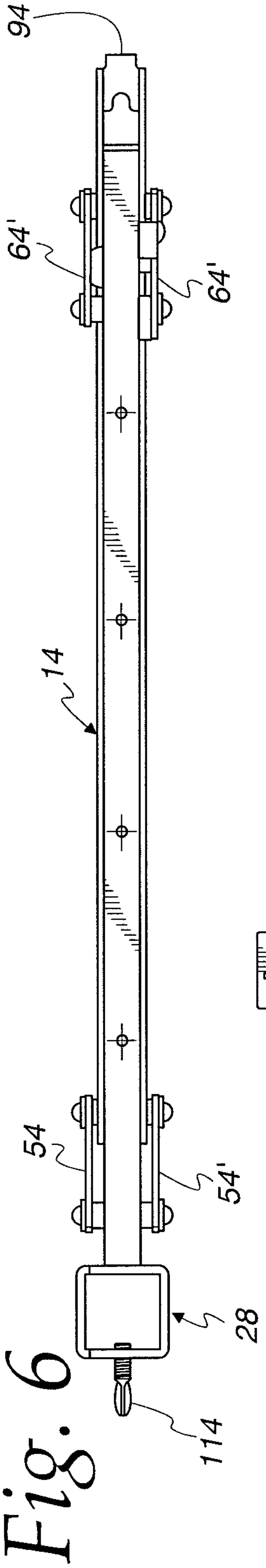
FIG. 6 is a top view of the security system in the FIG. 3 state.
Figure 7:
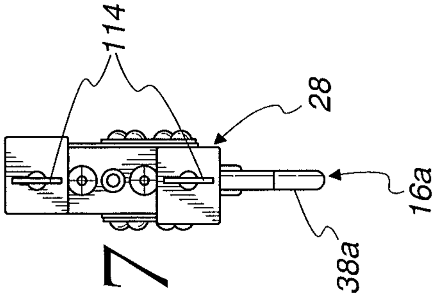
FIG. 7 is a rear elevation view of the security system in the FIG. 3 state.
Figure 8:
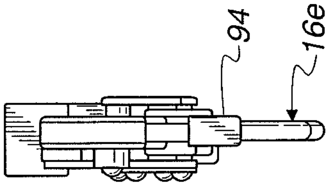
FIG. 8 is a front elevation view of the security system in the FIG. 3 state.

In FIGS. 4 and 9, the portable consumer article 10*a* is shown in the display position wherein the U-shaped portion 11*a*, defined by a strap 42*a* connected to a body 44*a*, straddles the arm 18*a* and under the weight of the portable consumer article 10*a* bears thereagainst. In this embodiment, the U-shaped portion 11*a* is part of a closed loop that is defined cooperatively by the U-shaped portion 11*a* and the body 44*a*. A like purse 10*b* is also shown in a hanging display position.

As explained above, the portable consumer article 10*a* is moved from a fully separated state into the display position by relatively moving the first arm 18*a* and the first portable consumer article 10*a* so as to cause the free end 20*a* of the arm 18*a* to be directed into and through the U-shaped portion 11*a*. In the display position, the U-shaped portion 11*a* is confined in lengthwise shifting along the arm 18*a* by the support 34*a* and the offset 38*a*.

With the portable consumer article 10*a* in the display position and the elongate component 40 in the first position, pivoting of the elongate component 40 into the second position therefor causes a part 46*a* of the elongate component 40 to move downwardly closer to and in an overlying relationship with the arm 18*a*, as seen clearly in FIG. 9, whereby the U-shaped portion 11*a* resides between the part 46*a* and the arm 18*a* and is fully encircled cooperatively by the part 46*a*, the offset 38*a*, the support 34*a*, and the arm 18*a*.

A similar structural configuration appears at each of the locations of the arms 18*b*, 18*c*, 18*d*, 18*e*.

In this embodiment, the part 46*a* is an edge at the base of a discrete void 48*a* bounded by a generally downwardly opening "U" shape. The void 48*a* creates a larger volume to accept the cross-section of the U-shaped portion 11*a*, as seen in FIG. 9, and also vertically defines/extends the blocking region which confines movement of the U-shaped portion 11*a* in opposite lengthwise directions relative to the elongate component 40.

Figure 21:
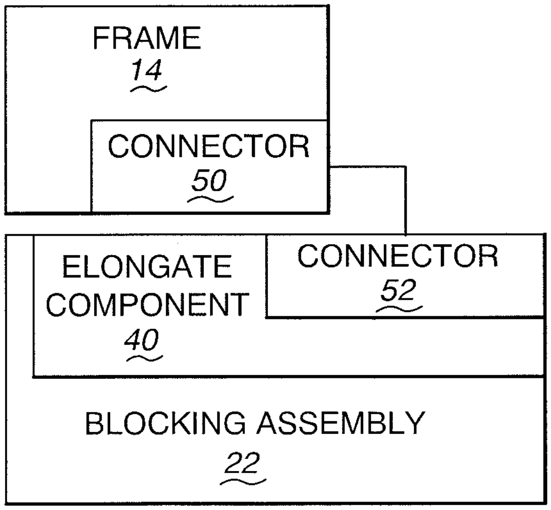
FIG. 21 is a schematic representation of a connection between a frame and an elongate component on a blocking assembly on the inventive security system.

As depicted schematically in FIG. 21, the elongate component 40 on the blocking assembly 22 may be movable relative to tile frame 14 between its first and second positions in any of a number of different manners. Cooperating connectors 50, 52, respectively on the frame 14 and elongate component 40, may cooperate to guide movement between first and second positions through translation, pivoting, etc.

In the depicted exemplary form, one pivoting arrangement for the elongate component 40 is shown in detail. This pivoting alternatively may occur around a single pivot axis, or otherwise. More preferably, and in the depicted form, a first link member 54 is used to connect the elongate component 40 to the frame 14. One link member end 56 is connected to the frame 14 for pivoting movement relative thereto around an axis 58. The other link member end 60 is connected to the elongate component 40 for pivoting movement relative thereto around an axis 62. Preferably, the axes 58, 62 are parallel.

While a single link member could be used to effect the connection of the elongate component 40, in the depicted embodiment, a second link member 64 is utilized.

One end 66 of the link member 64 is connected to the frame 14 for pivoting movement relative thereto around an axis 68. The other link member end 70 is connected to the elongate component 40 for pivoting movement relative thereto around an axis 72. The axes 68, 72 are substantially parallel with each other and the axes 58, 62 on the first link member 54.

As depicted, the link members 56, 64 are connected to create a parallel linkage arrangement whereby the elongate component 40 is guided in movement between its first and second positions while the length thereof substantially maintains a constant horizontal orientation through this range of movement.

For greater stability and more precise guided movement of the elongate component 40, each link member 54, 64 resides on one side of the frame and is matched with and commonly connected with link members 54', 64' on the other side of the frame 14. The link members 54, 54' pivot about the same axes 58, 62 relative to the frame 14 and elongate component 40. The link members 64, 64' pivot about the same axes 68, 72 relative to the frame 14 and elongate component 40.

Figure 2:
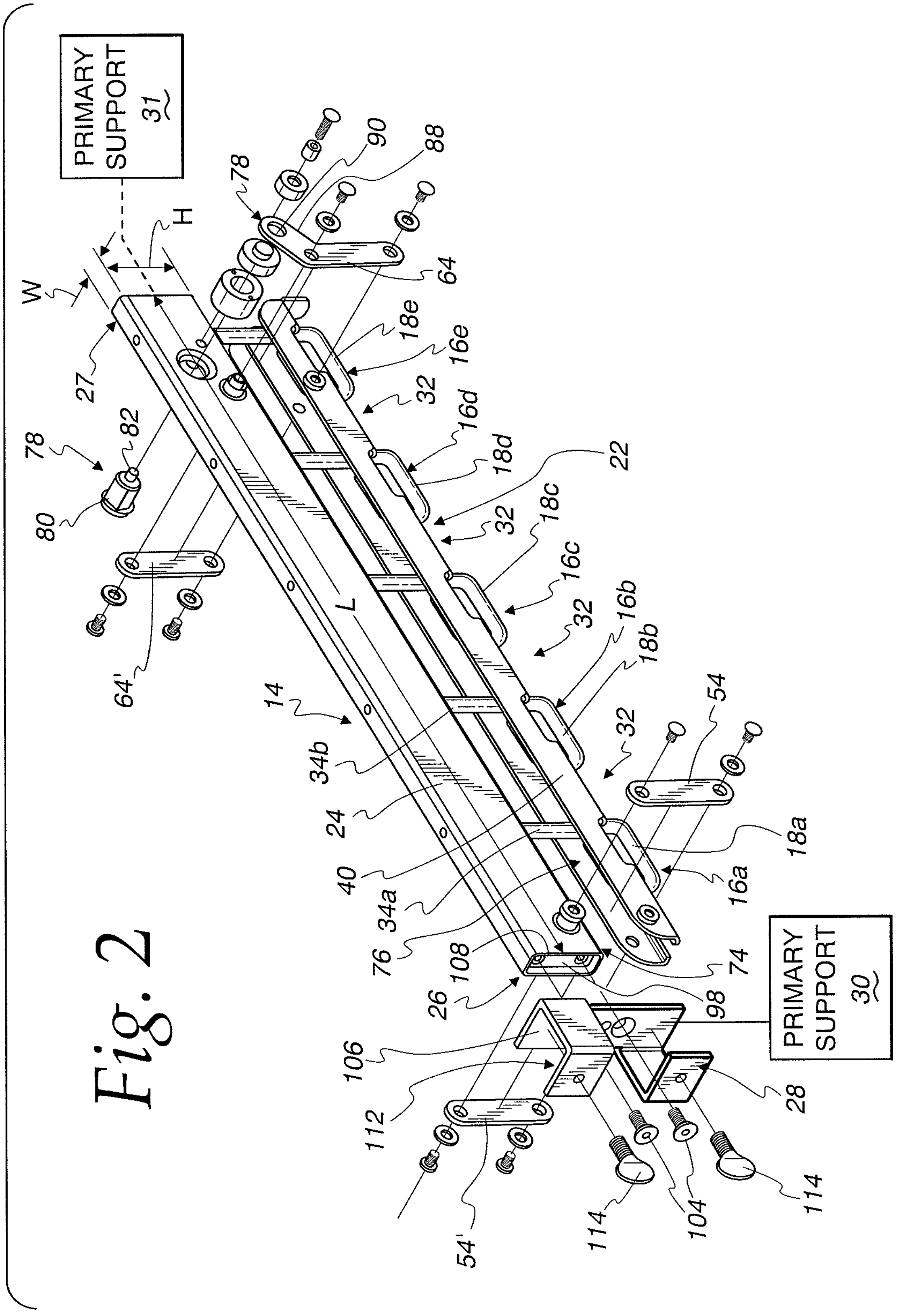
FIG. 2 is an exploded perspective view of one exemplary form of the inventive security system, as shown in schematic form in FIG. 1.

In this embodiment, the frame bottom portion at 74 is configured to cooperate with a portion 76 of the elongate component 40 so that the portions 74, 76 move from a separated relationship, as seen clearly in FIG. 2, into a nested relationship, as shown clearly in FIG. 4. In this latter relationship, the portion 74 of the frame 14 seats in the complementarily-shaped portion 76 of the elongate member 40 as an incident of the elongate component 40 moving from the first position into the second position therefor. This nesting arrangement could be reversed.

While not required, in this case, the receptacle portion 76 on the elongate component 40 is an upwardly opening "U" shape, in cross-section taken transversely to the length thereof, which relatively closely conforms to the bottom portion 74 on the elongate base member 24 that moves thereinto. This cooperating structure smoothly guides the elongate component 40 consistently into the second position therefor and additionally stabilizes the relationship between the elongate component 40 and elongate member 24 once this second position is realized. Aside from facilitating guided movement between parts and transition between states, this interaction also makes the overall structure less vulnerable to tampering, as by any attempt to pry the elongate component 40 away from the frame 14 with the elongate component 40 in its second position.

To maintain the elongate component 40 in its second position and thereby the blocking assembly 22 in its securing state, a locking assembly is provided at 78. As depicted, the exemplary locking assembly 78 consists of a keyed tumbler at 80 that has a post 82 that is extended with the locking assembly 78 in a locked state and retracted to the dotted line position in FIG. 16 with the locking assembly 78 in an unlocked state.

Figures 11, 12, 13, 14, 15, 16:
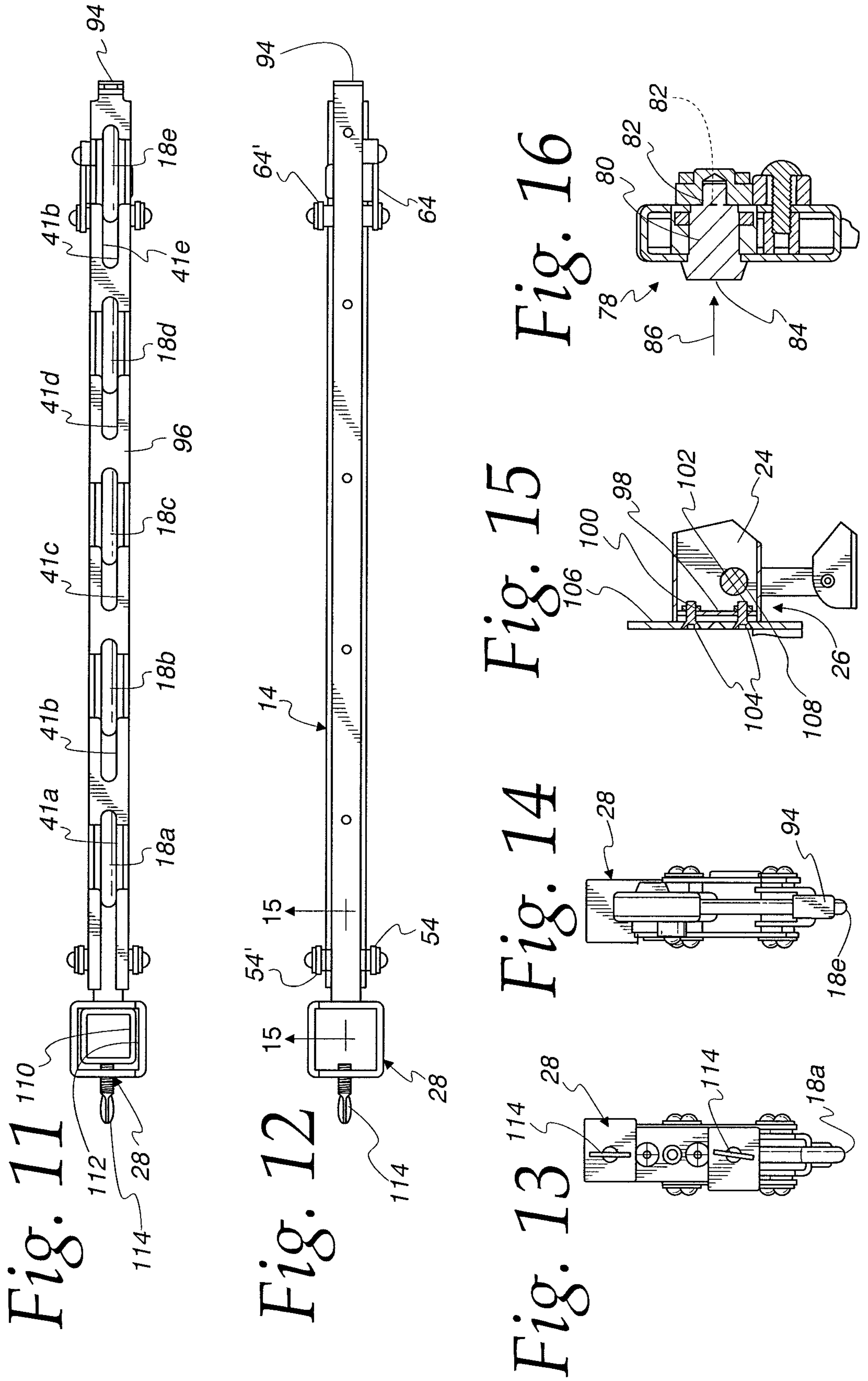
FIG. 11 is a bottom view of the security system in the FIG. 9 state.
FIG. 12 is a top view of the security system in the FIG. 9 state.
FIG. 13 is a rear elevation view of the security system in the FIG. 9 state.
FIG. 14 is a front elevation view of the security system in the FIG. 9 state.
FIG. 15 is a fragmentary, cross-sectional view of the security system taken along line 15-15 of FIG. 12.
FIG. 16 is a fragmentary, cross-sectional view of the security system taken along line 16-16 of FIG. 9.
Figure 17:
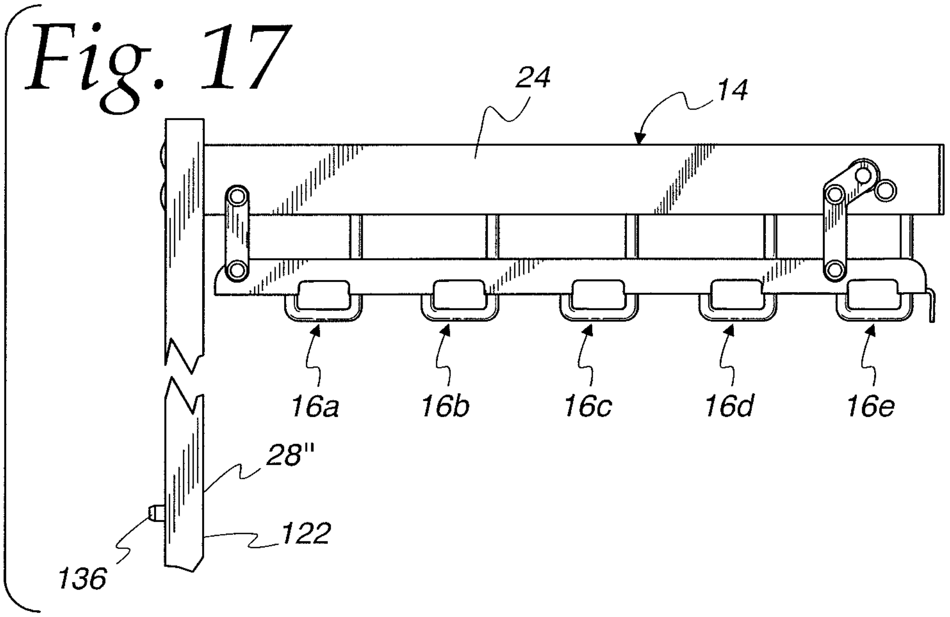
FIG. 17 is a view as in FIG. 9 with a different form of connector for supporting a frame on the security system.
Figure 18:
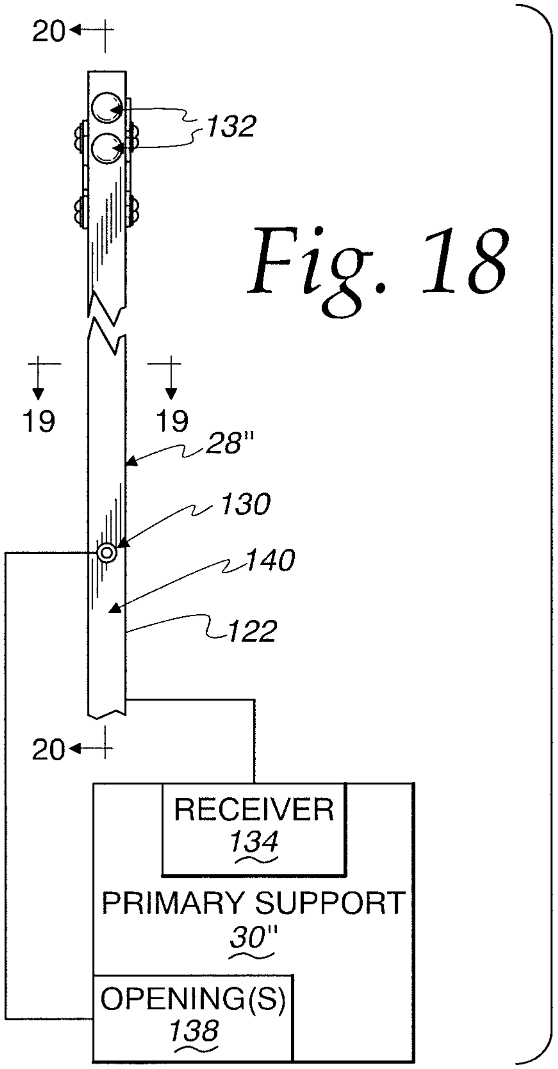
FIG. 18 is a rear elevation view of the security system and connector in FIG. 17 together with a schematic representation of a primary support to be engaged by the connector.
Figure 19:
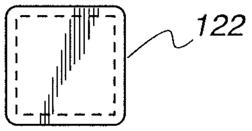
FIG. 19 is a cross-sectional view of the connector taken along line 19-19 of FIG. 18.
Figure 20:
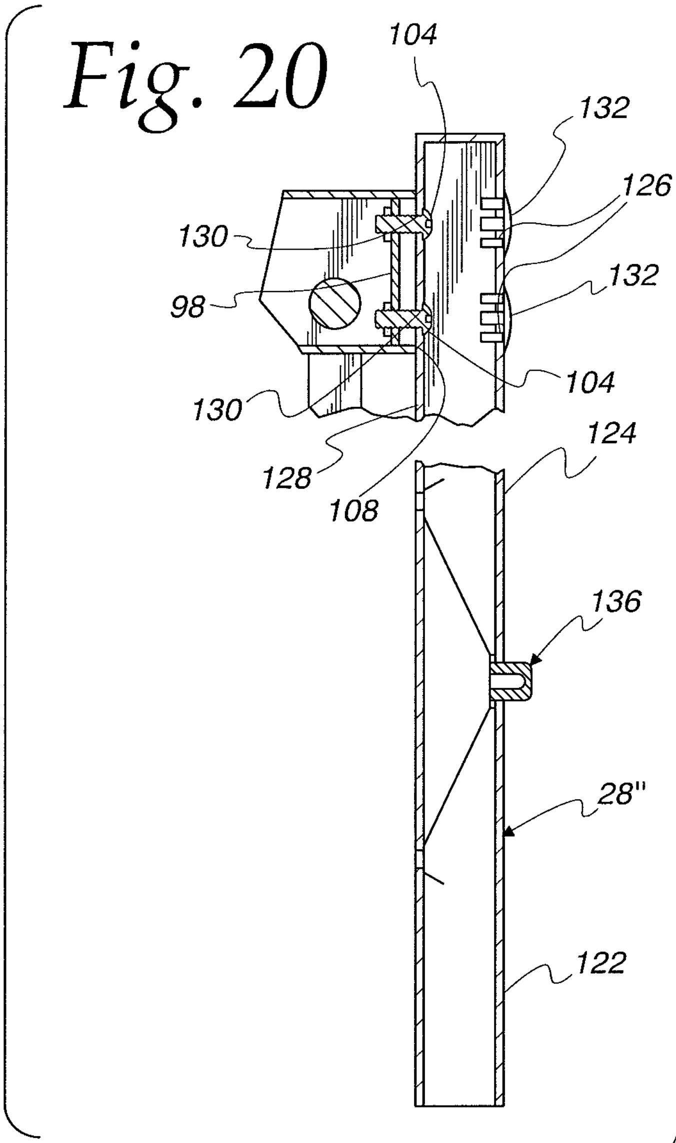
FIG. 20 is a fragmentary, cross-sectional view of the connector and part of a frame on the security system taken along line 20-20 of FIG. 18.

In this embodiment, the locking assembly 78 has a button 84 that is depressible in the direction of the arrow 86 to advance the post 82 to the solid line position in FIG. 16, representing the locked stated for the locking assembly 78. The pressing of the button 84 may automatically maintain the locked state whereupon a key or other activation device is required to change the locking assembly 78 from the locked state back into the unlocked state. Alternatively, a separate actuation device may be required to establish the locked state.

In this embodiment, the second link member 64 has an integral extension 88 with a through opening 90. As an incident of the elongate component 40 changing from its first position into its second position, the second link member 64 repositions from the FIG. 3 position into the FIG. 9 position. As this occurs, the opening 90 repositions to coincide with the path of the post 82. By then changing the locking assembly 78 from the unlocked state into the locked state, the post 82 is advanced into the opening 90 which blocks pivoting of the second link member 64 and thereby prevents the elongate component 40 from moving out of its second position, which would result in a change of state in the blocking assembly.

A stop component 92 projects from the frame member 24 and resides in the path of the link extension 88. The stop component 92 abuts the extension 88 to consistently locate the opening 90 on the second link member 64 directly in the path of the post 82 as the elongate component moves into its second position.

To facilitate repositioning of the elongate component 40, a tab 94 depends from the bottom wall 96 at one end 97 of the elongate component 40 and is situated so that it can be readily grasped by a user to conveniently apply a force that will change the elongate component 40 between its first and second positions, thereby changing the locking assembly between securing and loading states.

To facilitate attachment of the connector 28 to the frame 14, a mounting plate 98 is fixed within the elongate base member 24 at a location recessed slightly from the mounting end 26 towards the opposite end 27. The mounting plate 98 may be suitably fixed, as by welding.

The mounting plate 98 has threaded bores 100, 102 to accept a like number of fasteners 104.

The connector 28 has a wall 106 through which the fasteners 104 are directed to threadably engage the mounting plate 98. Tightening of the fasteners 104 draws the wall 106 against the edge 108 at the end 26 of the elongate base member 24. Through this arrangement, the connector 28 is securely fixed at the end 26.

The connector 28 is configured to allow an elongate member 110 (FIG. 11) with a generally square cross-sectional shape to be passed therethrough. The elongate member 110 has a generally matched shape to a receptacle 112 defined by the connector 28 so that the connector 28 can slide guidingly along the length of the elongate member 110. Hand operable set screws 114, threaded to the connector 28, can be borne against the elongate member 110 to fix the relationship of the connector 28 and elongate member 110 with the connector 28 at the desired lengthwise position on the elongate member 110. Typically, the elongate member 110 will be part of the primary support 30 and project upwardly. Thus, in setting up the security system 12, the height of the frame 14 can be selected from within a range of heights and fixed. At the same time, multiple frames 14 might be attached to the elongate member 110 in like fashion to increase display capacity.

Figure 22:
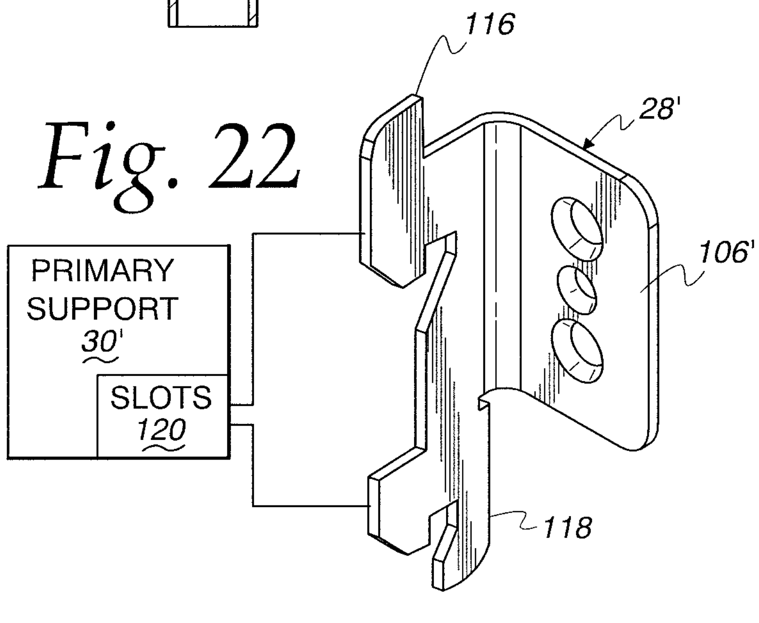
FIG. 22 is a perspective view of an alternative form of connector for the frame on the inventive security system and a schematic representation of a primary support to be engaged by the connector.

In FIG. 22, an alternative form of connector is shown at 28' which has a conventional-type arrangement of posts 116, 118 that can be engaged with separate slots 120 on a primary support 30' which may be a discrete member, a wall, etc. The connector 28' has a wall 106' that can be connected to the frame 14 in the same manner as the wall 106.

As shown in FIGS. 17-20, a further alternative connector 28" is shown in the form of an elongate member 122 that has a square cross-sectional configuration as viewed orthogonally to the length thereof.

One wall 124 of the elongate member 122 has access openings 126. The opposite wall 128 has separate, smaller openings 130 to accept the aforementioned fasteners 104 which can be controlled through the openings 126 and advanced through the openings 126 and threadably engaged with the mounting plate 98. Tightening of the fasteners 104 draws the wall 128 against the frame edge 108.

For aesthetic purposes, covering caps 132 can be pressed, one each into the openings 126, after assembly of the connector 28".

The elongate member 122 can be pressed telescopingly into a receiver 134 that is part of a primary support 30".

A spring-loaded plunger component 136 cooperates with one or more connectors/openings 138 on the primary support 30" to fix the lengthwise position of the elongate member 122 relative to the primary support 30". The selectively usable multiple openings 138 allow a degree of adjustability.

In one exemplary form, the primary support 30" has a sleeve with a complementary shape to the outer perimeter 140 of the elongate member to allow guided sliding movement relative thereto.

The foregoing disclosure of specific embodiments is intended to be illustrative of the broad concepts comprehended by the invention.

The invention claimed is:

1. A display comprising:

first and second portable consumer articles each having a U-shaped portion; and a security system comprising:

a frame comprising an elongate base member with a length between a mounting end and an opposite end and having first and second support assemblies respectively having first and second cantilevered arms respectively with first and second free ends, wherein the first and second cantilevered arms are spaced from the elongate base member, wherein each of the first and second cantilevered arms is elongate and has a length generally aligned with the length of the elongate base member; and a blocking assembly comprising an elongate component, the blocking assembly changeable selectively between; a) a loading state, with the elongate component in a first position; and b) a securing state, with the elongate component in a second position, the security system configured so that by relatively moving the first cantilevered arm and the first portable consumer article with the blocking assembly in the loading state, the first free end can be directed into and through the U-shaped portion on the first portable consumer article to allow the U-shaped portion on the first portable consumer article to straddle and bear downwardly against the first cantilevered arm whereby the first portable consumer article is in a display position, the security system configured so that by relatively moving the second cantilevered arm and the second portable consumer article with the blocking assembly in the loading state, the second free end can be directed into and through the U-shaped portion on the second portable consumer article to allow the U-shaped portion on the second portable consumer article to straddle and bear downwardly against the second cantilevered arm whereby the second portable consumer article is in a display position, the security system configured so that: a) with the first and second portable consumer articles in respective display positions, by changing the blocking assembly from the loading state into the securing state the elongate component blocks the first and second portable consumer articles from being separated from the security system; and b) with the first and second portable consumer articles in respective display positions, by changing the blocking assembly from the securing state into the loading state either of the first and second portable consumer articles can be separated from the security system while maintaining the other of the first and second portable consumer articles in its display position.

2. The display according to claim 1 wherein the mounting end is connected to a primary support so that the length of the elongate base member projects away from the primary support.

3. The display according to claim 2 wherein the elongate base member is cantilever mounted with respect to the primary support.

4. The display according to claim 2 wherein the first and second cantilevered arms reside below the elongate base member.

5. The display according to claim 4 wherein the frame has first and second supports connecting respectively between the elongate base member and the first and second cantilevered arms.

6. The display according to claim 5 wherein the first and second supports are each substantially elongate with a length, the lengths of the first support and first cantilevered arm align to produce an "L" shape, and the lengths of the second support and second cantilevered arm align to produce an "L" shape.

7. The display according to claim 6 wherein the free ends of the first and second cantilevered arms respectively have first and second offsets, the lengths of the first support and first cantilevered arm together with the first offset align to produce a "J" shape, and the lengths of the second support and second cantilevered arm together with the second offset align to produce a "J" shape.

8. The display according to claim 6 wherein the frame has a portion that is configured to cooperate with a portion of the elongate component so that the portions of the frame and elongate component move from a separated relationship to a nested relationship, wherein one of the portions of the frame and elongate member seats in the other of the portions of the frame and elongate member as an incident of the elongate component moving from the first position into the second position.

9. The display according to claim 2 further in combination with the primary support that comprises a vertically extending component.

10. The display according to claim 1 wherein the elongate component pivots relative to the frame in moving between the first and second positions.

11. The display according to claim 10 wherein with the elongate component in the second position, the U-shaped portion of the first portable consumer article in its display position resides between one part of the elongate component and the first cantilevered arm, and the U-shaped portion of the second portable consumer article in its display position resides between another part of the elongate component and the second cantilevered arm.

12. The display according to claim 11 wherein with the elongate component in the second position the elongate component and first cantilevered arm cooperatively extend fully around a part of the U-shaped portion of the first portable consumer article in its display position.

13. The display according to claim 12 wherein the elongate component has a discrete void into which the part of the U-shaped portion of the first portable consumer article extends with the first portable consumer article in its display position and the elongate component in the second position.

14. The display according to claim 1 wherein each of the first and second portable consumer articles is a purse with a body and a strap, the strap defines the U-shaped portion and in conjunction with the body defines a closed loop shape.

15. A display comprising:

first and second portable consumer articles each having a U-shaped portion; and a security system comprising:

a frame comprising an elongate base member with a length between a mounting end and an opposite end and having first and second support assemblies respectively having first and second cantilevered arms respectively with first and second free ends, wherein each of the first and second cantilevered arms is elongate and has a length generally aligned with the length of the elongate base member; and a blocking assembly comprising an elongate component, the blocking assembly changeable selectively between; a) a loading state, with the elongate component in a first position; and b) a securing state, with the elongate component in a second position, the security system configured so that by relatively moving the first cantilevered arm and the first portable consumer article with the blocking assembly in the loading state, the first free end can be directed into and through the U-shaped portion on the first portable consumer article to allow the U-shaped portion on the first portable consumer article to straddle and bear downwardly against the first cantilevered arm whereby the first portable consumer article is in a display position, the security system configured so that by relatively moving the second cantilevered arm and the second portable consumer article with the blocking assembly in the loading state, the second free end can be directed into and through the U-shaped portion on the second portable consumer article to allow the U-shaped portion on the second portable consumer article to straddle and bear downwardly against the second cantilevered arm whereby the second portable consumer article is in a display position, the security system configured so that: a) with the first and second portable consumer articles in respective display positions, by changing the blocking assembly from the loading state into the securing state the elongate component blocks the first and second portable consumer articles from being separated from the security system; and b) with the first and second portable consumer articles in respective display positions, by changing the blocking assembly from the securing state into the loading state either of the first and second portable consumer articles can be separated from the security system while maintaining the other of the first and second portable consumer articles in its display position, wherein the elongate component pivots relative to the frame in moving between the first and second positions, wherein the elongate component is connected to the frame through a first link member with spaced ends, one of the spaced ends connected to the frame for pivoting movement relative to the frame around a first axis, the other of the spaced ends connected to the elongate component for pivoting movement relative to the elongate component around a second axis.

16. The display according to claim 15 wherein the elongate component is connected to the frame through a second link member with spaced ends, one of the spaced ends of the second link member connected to the frame for pivoting movement relative to the frame around a third axis, the other of the spaced ends of the second link member connected to the elongate component for pivoting movement relative to the elongate component around a fourth axis.

17. The display according to claim 16 wherein the length of the elongate component maintains a substantially constant horizontal orientation as the elongate member is changed between the first and second positions.

18. The display according to claim 15 wherein the security system further comprises a locking assembly that is changeable between locked and unlocked states, the locking assembly configured so that in the locked state the locking assembly blocks pivoting of the first link relative to the frame.

19. A display comprising:

first and second portable consumer articles each having a U-shaped portion; and a security system comprising:

a frame comprising an elongate base member with a length and having first and second support assemblies respectively having first and second cantilevered arms respectively with first and second free ends; and a blocking assembly comprising an elongate component, the blocking assembly changeable selectively between: a) a loading state with the elongate component in a first position; and b) a securing state with the elongate component in a secured position, the security system configured so that by relatively moving the U-shaped portion on the first portable consumer article lengthwise relative to the elongate base member with the blocking assembly in the loading state, the first free end can be directed into and through the U-shaped portion on the first portable consumer article to allow the U-shaped portion on the first portable consumer article to straddle and bear downwardly against the first cantilevered arm whereby the first portable consumer article is in a display position, the security system configured so that by relatively moving the U-shaped portion on the second portable consumer article lengthwise relative to the elongate base member with the blocking assembly in the loading state, the second free end can be directed into and through the U-shaped portion on the second portable consumer article to allow the U-shaped portion on the second portable consumer article to straddle and bear downwardly against the second cantilevered arm whereby the second portable consumer article is in a display position, the security system configured so that: a) with the first and second portable consumer articles in respective display positions, by changing the blocking assembly from the loading state into the securing state the first and second portable consumer articles are prevented from being separated from the security system; and b) with the first and second portable consumer articles in respective display positions, by changing the blocking assembly from the securing state into the loading state either of the first and second portable consumer articles can be separated from the security system by moving along its respective cantilevered arm past the free end on its respective cantilevered arm while maintaining the other of the first and second portable consumer articles in its display position.

20. A security display system comprising:

an elongate base member configured to be mounted to a support structure;

first and second hook-shaped support assemblies having first and second cantilevered arms fixed to the elongate base member respectively with first and second distal free ends, wherein the first and second hook-shaped support assemblies extend downwardly from the elongate base member and are configured to store items thereon; and a blocking assembly comprising an elongate rail;

at least one link having a first end and a second end, wherein the first end of the at least one link is pivotably attached to the elongate base member, and the second end of the at least one link is pivotably attached to the elongate rail so that the elongate rail can move between a securing position and a loading position while being parallel to the elongate base member, wherein when the elongate rail is in the securing position, the elongate rail is spaced apart from the base member below the elongate base member a first distance, and the elongate rail is situated relative to the distal free ends of the first and second hook-shaped support assemblies so that the items stored on the first and second hook-shaped support assemblies are prevented from being removed therefrom;

wherein when the elongate rail is in the loading position, the elongate rail is below the elongate base member a second distance that is less than the first distance, and the blocking assembly is spaced apart from the distal free ends of the first and second hook assemblies defining a gap therebetween so that items can be placed on or removed from the first and second hook-shaped support assemblies.

* * * * *